(12) United States Patent
Goetzinger et al.

(10) Patent No.: US 7,680,043 B2
(45) Date of Patent: Mar. 16, 2010

(54) NETWORK PROCESSOR HAVING FAST FLOW QUEUE DISABLE PROCESS

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2462 days.

(21) Appl. No.: 10/102,343

(22) Filed: Mar. 20, 2002

(65) Prior Publication Data

US 2003/0179706 A1  Sep. 25, 2003

(51) Int. Cl.
*H04J 3/14* (2006.01)
*G06F 15/16* (2006.01)

(52) U.S. Cl. .................. 370/231; 370/235; 370/398; 370/395.21; 370/412; 370/421; 709/229; 709/232; 709/233

(58) Field of Classification Search ......... 370/227–237, 370/395.1–421
See application file for complete search history.

(56) References Cited

U.S. PATENT DOCUMENTS

| | | | |
|---|---|---|---|
| 4,621,359 A | 11/1986 | McMillen | |
| 5,249,184 A | 9/1993 | Woeste et al. | |
| 5,490,141 A | 2/1996 | Lai et al. | |
| 5,548,590 A | 8/1996 | Grant et al. | |
| 5,629,928 A | 5/1997 | Calvignac et al. | |
| 5,650,993 A | 7/1997 | Lakshman et al. | |
| 5,708,837 A * | 1/1998 | Handlogten | 712/23 |
| 5,742,772 A | 4/1998 | Sreenan | |
| 5,790,545 A | 8/1998 | Holt et al. | |
| 5,831,971 A | 11/1998 | Bonomi et al. | |
| 5,835,494 A | 11/1998 | Hughes et al. | |
| 5,844,890 A | 12/1998 | Delp et al. | |
| 5,850,399 A | 12/1998 | Ganmukhi et al. | |
| 5,905,730 A | 5/1999 | Yang et al. | |
| 5,926,459 A | 7/1999 | Lyles et al. | |
| 5,926,481 A | 7/1999 | Wang et al. | |

(Continued)

FOREIGN PATENT DOCUMENTS

EP    0859492 A2    8/1998

(Continued)

OTHER PUBLICATIONS

U.S. Appl. No. 10/004,373, filed Nov. 1, 2001, "QoS Scheduler and Method for Implementing Peak Service Distance Using Next Peak Service Time Violated Indication".

(Continued)

*Primary Examiner*—Ayaz R Sheikh
*Assistant Examiner*—Venkatesh Haliyur
(74) *Attorney, Agent, or Firm*—Dugan & Dugan, PC

(57) ABSTRACT

In a first aspect, a network processor services a plurality of flows including a first flow and a discard flow. The first flow includes a first flow queue and the discard flow includes a discard queue that lists frames to be discarded. An indication is made that the first flow is to be disabled. In response to the indication, all frames included in the first flow queue are transferred to the discard queue. Because the first flow queue is now empty, reconfiguration of the first flow may proceed immediately.

6 Claims, 5 Drawing Sheets

U.S. PATENT DOCUMENTS

| | | | |
|---|---|---|---|
| 5,946,297 A | | 8/1999 | Calvignac et al. |
| 5,953,318 A * | | 9/1999 | Nattkemper et al. ......... 370/236 |
| 5,999,963 A | | 12/1999 | Bruno et al. |
| 6,014,367 A | | 1/2000 | Joffe |
| 6,018,527 A | | 1/2000 | Yin et al. |
| 6,028,842 A | | 2/2000 | Chapman et al. |
| 6,028,843 A | | 2/2000 | Delp et al. |
| 6,031,822 A | | 2/2000 | Wallmeier |
| 6,038,217 A | | 3/2000 | Lyles |
| 6,041,059 A | | 3/2000 | Joffe et al. |
| 6,052,751 A | | 4/2000 | Runaldue et al. |
| 6,064,650 A | | 5/2000 | Kappler et al. |
| 6,064,677 A | | 5/2000 | Kappler et al. |
| 6,067,301 A | | 5/2000 | Aatresh |
| 6,072,772 A | | 6/2000 | Charny et al. |
| 6,072,800 A | | 6/2000 | Lee |
| 6,078,953 A | | 6/2000 | Vaid et al. |
| 6,081,507 A | | 6/2000 | Chao et al. |
| 6,088,736 A * | | 7/2000 | Manning et al. ............. 709/234 |
| 6,092,115 A | | 7/2000 | Choudhury et al. |
| 6,094,435 A | | 7/2000 | Hoffman et al. |
| 6,101,193 A | | 8/2000 | Ohba |
| 6,104,700 A | | 8/2000 | Haddock et al. |
| 6,108,307 A | | 8/2000 | McConnell et al. |
| 6,122,274 A * | | 9/2000 | Kumar ........................ 370/388 |
| 6,122,673 A | | 9/2000 | Basak et al. |
| 6,144,669 A | | 11/2000 | Williams et al. |
| 6,157,614 A | | 12/2000 | Pasternak et al. |
| 6,157,649 A | | 12/2000 | Peirce et al. |
| 6,157,654 A | | 12/2000 | Davis |
| 6,160,812 A | | 12/2000 | Bauman et al. |
| 6,169,740 B1 | | 1/2001 | Morris et al. |
| 6,188,698 B1 | | 2/2001 | Galand et al. |
| 6,222,822 B1 * | | 4/2001 | Gerardin et al. .............. 370/230 |
| 6,226,267 B1 | | 5/2001 | Spinney et al. |
| 6,229,812 B1 | | 5/2001 | Parruck et al. |
| 6,229,813 B1 | | 5/2001 | Buchko et al. |
| 6,236,647 B1 | | 5/2001 | Amalfitano |
| 6,246,692 B1 | | 6/2001 | Dai et al. |
| 6,259,699 B1 * | | 7/2001 | Opalka et al. ................. 370/398 |
| 6,266,702 B1 | | 7/2001 | Darnell et al. |
| 6,324,165 B1 * | | 11/2001 | Fan et al. ..................... 370/232 |
| 6,335,935 B2 * | | 1/2002 | Kadambi et al. ............. 370/396 |
| 6,356,546 B1 | | 3/2002 | Beshai |
| 6,389,019 B1 | | 5/2002 | Fan et al. |
| 6,389,031 B1 | | 5/2002 | Chao et al. |
| 6,404,752 B1 * | | 6/2002 | Allen et al. ................... 370/335 |
| 6,404,768 B1 | | 6/2002 | Basak et al. |
| 6,412,000 B1 * | | 6/2002 | Riddle et al. ................. 709/224 |
| 6,460,120 B1 * | | 10/2002 | Bass et al. .................... 711/148 |
| 6,469,982 B1 | | 10/2002 | Henrion et al. |
| 6,481,251 B1 | | 11/2002 | Meier et al. |
| 6,556,578 B1 * | | 4/2003 | Silberschatz et al. ......... 370/412 |
| 6,563,829 B1 | | 5/2003 | Lyles et al. |
| 6,570,848 B1 * | | 5/2003 | Loughran et al. ......... 370/230.1 |
| 6,608,625 B1 | | 8/2003 | Chin et al. |
| 6,611,522 B1 * | | 8/2003 | Zheng et al. ............. 370/395.21 |
| 6,646,986 B1 | | 11/2003 | Beshai |
| 6,657,955 B1 * | | 12/2003 | Bonneau et al. .............. 370/229 |
| 6,671,258 B1 * | | 12/2003 | Bonneau ...................... 370/235 |
| 6,721,273 B1 * | | 4/2004 | Lyon .......................... 370/235 |
| 6,721,325 B1 | | 4/2004 | Duckering et al. |
| 6,775,287 B1 | | 8/2004 | Fukano et al. |
| 6,804,249 B1 | | 10/2004 | Bass et al. |
| 6,810,012 B1 | | 10/2004 | Yin et al. |
| 6,810,043 B1 | | 10/2004 | Naven et al. |
| 6,810,426 B2 | | 10/2004 | Mysore et al. |
| 6,813,274 B1 | | 11/2004 | Suzuki et al. |
| 6,832,261 B1 * | | 12/2004 | Westbrook et al. ........... 709/236 |
| 6,842,443 B2 * | | 1/2005 | Allen et al. ................... 370/335 |
| 6,850,490 B1 | | 2/2005 | Woo et al. |
| 6,885,664 B2 | | 4/2005 | Ofek et al. |
| 6,888,830 B1 | | 5/2005 | Snyder, II et al. |
| 6,891,835 B2 | | 5/2005 | Kalkunte et al. |
| 6,973,036 B2 * | | 12/2005 | Goetzinger et al. .......... 370/235 |
| 6,982,986 B2 * | | 1/2006 | Goetzinger et al. .......... 370/412 |
| 6,987,760 B2 * | | 1/2006 | Calvignac et al. ............ 370/369 |
| 7,002,980 B1 * | | 2/2006 | Brewer et al. ................ 370/414 |
| 7,016,366 B2 * | | 3/2006 | Kawarai et al. .............. 370/413 |
| 7,020,137 B2 | | 3/2006 | Kadambi et al. |
| 7,023,864 B2 * | | 4/2006 | Bennett ....................... 370/412 |
| 7,046,676 B2 * | | 5/2006 | Goetzinger et al. ....... 370/395.4 |
| 7,058,974 B1 * | | 6/2006 | Maher et al. ................... 726/13 |
| 7,062,568 B1 * | | 6/2006 | Senevirathne et al. ........ 709/234 |
| 7,099,275 B2 * | | 8/2006 | Sarkinen et al. ............. 370/230 |
| 7,103,051 B2 * | | 9/2006 | Goetzinger et al. ....... 370/395.4 |
| 7,123,622 B2 * | | 10/2006 | Bass et al. .................... 370/413 |
| 7,149,212 B2 * | | 12/2006 | Calvignac et al. ............ 370/360 |
| 7,158,528 B2 * | | 1/2007 | Dell et al. ..................... 370/416 |
| 7,187,684 B2 * | | 3/2007 | Goetzinger et al. .......... 370/412 |
| 7,215,639 B2 * | | 5/2007 | De Maria et al. ............. 370/235 |
| 7,280,474 B2 * | | 10/2007 | Goetzinger et al. .......... 370/235 |
| 7,310,345 B2 * | | 12/2007 | Goetzinger et al. .......... 370/412 |
| 7,317,683 B2 * | | 1/2008 | Goetzinger et al. ....... 370/230.1 |
| 2001/0004363 A1 | | 6/2001 | Usukura |
| 2001/0007561 A1 * | | 7/2001 | Aznar et al. .................. 370/409 |
| 2001/0012294 A1 | | 8/2001 | Kadambi et al. |
| 2001/0033581 A1 * | | 10/2001 | Kawarai et al. .............. 370/468 |
| 2002/0003795 A1 | | 1/2002 | Oskouy et al. |
| 2002/0023168 A1 | | 2/2002 | Bass et al. |
| 2002/0024830 A1 | | 2/2002 | Yoneda |
| 2002/0044563 A1 * | | 4/2002 | Magill et al. ................. 370/411 |
| 2002/0048277 A1 * | | 4/2002 | Bennett ....................... 370/412 |
| 2002/0122386 A1 * | | 9/2002 | Calvignac et al. ............ 370/230 |
| 2002/0136230 A1 * | | 9/2002 | Dell et al. ..................... 370/416 |
| 2002/0154634 A1 * | | 10/2002 | Basso et al. .................. 370/390 |
| 2002/0163922 A1 * | | 11/2002 | Dooley et al. ................ 370/412 |
| 2002/0176429 A1 * | | 11/2002 | Calvignac et al. ............ 370/411 |
| 2002/0178313 A1 * | | 11/2002 | Gary ........................... 710/260 |
| 2002/0181455 A1 | | 12/2002 | Norman et al. |
| 2003/0043742 A1 * | | 3/2003 | De Maria et al. ............. 370/230 |
| 2003/0050954 A1 | | 3/2003 | Tayyar et al. |
| 2003/0058879 A1 | | 3/2003 | Rumph |
| 2003/0058880 A1 * | | 3/2003 | Sarkinen et al. ............. 370/413 |
| 2003/0081542 A1 * | | 5/2003 | Goetzinger et al. .......... 370/229 |
| 2003/0081543 A1 * | | 5/2003 | Goetzinger et al. .......... 370/229 |
| 2003/0081544 A1 * | | 5/2003 | Goetzinger et al. .......... 370/229 |
| 2003/0081545 A1 * | | 5/2003 | Goetzinger et al. .......... 370/229 |
| 2003/0081549 A1 * | | 5/2003 | Goetzinger et al. ....... 370/230.1 |
| 2003/0081552 A1 * | | 5/2003 | Goetzinger et al. .......... 370/235 |
| 2003/0081611 A1 * | | 5/2003 | Goetzinger et al. ....... 370/395.4 |
| 2003/0081612 A1 * | | 5/2003 | Goetzinger et al. ..... 370/395.21 |

FOREIGN PATENT DOCUMENTS

| | | |
|---|---|---|
| EP | 0957602 A2 | 11/1999 |
| EP | 0989770 A1 | 3/2000 |
| EP | 1049352 A2 | 11/2000 |
| EP | 1061763 A2 | 12/2000 |
| JP | 04-094240 | 3/1992 |
| JP | 2000183886 A | 6/2000 |
| JP | 2000295247 A | 10/2000 |
| JP | 2001007822 A | 12/2000 |
| WO | WO99/35792 A1 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

U.S. Appl. No. 10/004,416, filed Nov. 1, 2001, "QoS Scheduler and Method for Implementing Quality of Servie With Aging Time Stamps".

U.S. Appl. No. 10/004,440, filed Nov. 1, 2002, "QoS Scheduler and Method for Implementing Quality of Service with Cached Status Array".

U.S. Appl. No. 10/016,518, filed Nov. 1, 2001, "Weighted Fair Queue Having Extended Effective Range".

U.S. Appl. No. 10/015,994, filed Nov. 1, 2001, "Weighted Fair Queue Serving Plural Output Ports".

U.S. Appl. No. 10/015,760, filed Nov. 1, 2001, "Weighted Faire Queue Having Adjustable Scaling Factor".

U.S. Appl. No. 10/002,085, filed Nov. 1, 2001, "Empty Indicators for Weighted Fair Queues".

U.S. Appl. No. 10/004,217, filed Nov. 1, 2001, "QoS Scheduler and Method for Implementing Quality of Service Anticipating the End of a Chain of Flows".

Abstract of Publication entitled "Design of packet-fair queuing schedulers using a RAM-based searching engine" by HJ Chao et al, IEEE Journal on Selected Areas in Communications, vol. 17, No. 6, pp. 1105-1126, Jun. 1999.

U.S. Appl. No. 10/102,166, filed Mar. 20, 2002, Method and Apparatus for Improving the Fairness of New Attaches to a Weighted Fair Queue in a Quality of Service (QoS) Scheduler.

Lyons et al., "Estimating Clock Speeds for the ATMSWITCH Architecture", Proc. Networks '99 (The Third New Zealand ATM and Broadband Workshop), Jan. 21-22, 1999, pp. 39-53.

* cited by examiner

NETWORK PROCESSOR HAVING FAST FLOW QUEUE DISABLE PROCESS

FIELD OF THE INVENTION

The present invention is concerned with data and storage communication systems and is more particularly concerned with flow queue management in a network processor.

BACKGROUND OF THE INVENTION

Data and storage communication networks are in widespread use. In many data and storage communication networks, data packet switching is employed to route data packets or frames from point to point between source and destination, and network processors are employed to handle transmission of data into and out of data switches.

FIG. 1 is a block diagram illustration of a conventional network processor in which the present invention may be applied. The network processor, which is generally indicated by reference numeral 10, may be constituted by a number of components mounted on a card or "blade". Within a data communication network, a considerable number of blades containing network processors may be interposed between a data switch and a data network.

The network processor 10 includes data flow chips 12 and 14. The first data flow chip 12 is connected to a data switch 15 (shown in phantom) via first switch ports 16, and is connected to a data network 17 (shown in phantom) via first network ports 18. The first data flow chip 12 is positioned on the ingress side of the switch 15 and handles data frames that are inbound to the switch 15.

The second data flow chip 14 is connected to the switch 15 via second switch ports 20 and is connected to the data network 17 via second network ports 22. The second data flow chip 14 is positioned on the egress side of the switch 15 and handles data frames that are outbound from the switch 15.

As shown in FIG. 1, a first data buffer 24 is coupled to the first data flow chip 12. The first data buffer 24 stores inbound data frames pending transmission of the inbound data frames to the switch 15. A second data buffer 26 is coupled to the second data flow chip 14, and stores outbound data frames pending transmission of the outbound data frames to the data network 17.

The network processor 10 also includes a first processor chip 28 coupled to the first data flow chip 12. The first processor chip 28 supervises operation of the first data flow chip 12 and may include multiple processors. A second processor chip 30 is coupled to the second data flow chip 14, supervises operation of the second data flow chip 14 and may include multiple processors.

A control signal path 32 couples an output terminal of second data flow chip 14 to an input terminal of first data flow chip 12 (e.g., to allow transmission of data frames therebetween).

The network processor 10 further includes a first scheduler chip 34 coupled to the first data flow chip 12. The first scheduler chip 34 manages the sequence in which inbound data frames are transmitted to the switch 15 via first switch ports 16. A first memory 36 such as a fast SRAM is coupled to the first scheduler chip 34 (e.g., for storing data frame pointers (flow queues) and flow control information as described further below). The first memory 36 may be, for example, a QDR (quad data rate) SRAM.

A second scheduler chip 38 is coupled to the second data flow chip 14. The second scheduler chip 38 manages the sequence in which data frames are output from the second network ports 22 of the second data flow chip 14. Coupled to the second scheduler chip 38 are at least one and possibly two memories (e.g., fast SRAMs 40) for storing data frame pointers (flow queues) and flow control information. The memories 40 may, like the first memory 36, be QDRS. The additional memory 40 on the egress side of the network processor 10 may be needed because of a larger number of flows output through the second network ports 22 than through the first switch ports 16.

FIG. 2 schematically illustrates conventional queuing arrangements that may be provided for a data flow chip/ scheduler pair (either the first data flow chip 12 and the first scheduler chip 34 or the second data flow chip 14 and the second scheduler chip 38) of the network processor 10 of FIG. 1. In the particular example illustrated in FIG. 2, the first data flow chip 12 and the first scheduler chip 34 are illustrated, but a very similar queuing arrangement may be provided in connection with the second data flow chip 14 and the second scheduler chip 38. In the queuing arrangement for the first data flow chip 12 and the first scheduler chip 34, incoming data frames (from data network 17) are buffered in the input data buffer 24 associated with the first data flow chip 12 (FIG. 1). Each data frame is associated with a data flow or "flow". As is familiar to those who are skilled in the art, a "flow" represents a one-way connection between a source and a destination.

The first scheduler chip 34 includes flow scheduling calendars 41 (of which one is shown in FIG. 2) which define output schedules for flows which are entitled to a scheduled QoS (Quality of Service) with guaranteed bandwidth, thus enjoying high priority.

The first scheduler chip 34 also includes scheduling queues 42 (of which one is shown in FIG. 2) which arbitrates among flows entitled to a "best effort" or "available bandwidth" (lower priority) QoS. The scheduling queue 42 defines a sequence in which the flows enqueued therein are to be serviced.

As shown in FIG. 2, the flow scheduling calendar 41 and scheduling queue 42 share a respective output port 44 of the first data flow chip 12. It is to be understood that the output port 44 is one of the first switch ports 16 illustrated in FIG. 1. (However, if the data flow chip/scheduler pair under discussion were the egress side data flow chip 14 and scheduler chip 38, then the output port 44 would be one of the network ports 22.) Although only one flow scheduling calendar 41 and one scheduling queue 42 and one corresponding output port 44 are shown, it should be understood that in fact there may be plural output ports and corresponding flow scheduling calendars and scheduling queues each assigned to a respective port. (However, according to an alternative embodiment, disclosed in co-pending patent application Ser. No. 10/015,994, filed Nov. 1, 2001, a group of output ports may be associated with each scheduling queue 42. This co-pending patent application is incorporated herein by reference.)

The memory 36 associated with the first scheduler chip 34 holds flow queues made up of pointers ("frame pointers") to locations in the first data buffer 24 corresponding to data frames associated with the flow scheduled by the flow scheduling calendar 41 or enqueued in the scheduling queue 42. The memory 36 also stores flow control information, such as information indicative of the QoS to which flows are entitled.

FIG. 3 is a schematic representation of a typical flow queue 50 stored in the memory 36. The flow queue 50 includes a header (queue identifier 52) that identifies the particular flow queue and its corresponding flow. The rest of the flow queue 50 is made up of a linked list (or "string") 54 of frame pointers including a first frame pointer 56 ("FRAME 1") corresponding to the head of the flow queue 50 and a last frame pointer 58 ("FRAME n") corresponding to the tail of the flow queue 50. As indicated at 60, each frame pointer in the string 54, except for the last frame pointer 58, contains a reference to the next frame pointer in the string 54.

When the flow scheduling calendar 41 or the scheduling queue 42 indicates that a particular flow scheduled or enqueued therein is the next to be serviced, reference is made to the first frame pointer 56 of the corresponding flow queue 50, and the corresponding frame data pointed to by the first frame pointer 56 is transferred from the first data buffer 24 to an output queue 46 associated with the output port 44. The first frame pointer 56 is then removed from the flow queue 50 and the next frame pointer ("FRAME 2") becomes the head of the flow queue 50.

When a new frame for the flow is received, the frame data is buffered in the first data buffer 24, and a corresponding frame pointer is added to the tail of the string 54 of the corresponding flow queue 50.

The memory 36 also stores a discard queue (not separately shown) which is a linked list of frame pointers corresponding to frames stored in the first data buffer 24 that are to be discarded without being transmitted. As is familiar to those who are skilled in the art, frames stored in the first data buffer 24 may be discarded because they are in excess of the number of frames allowed to a flow according to its Quality of Service. Alternatively, frames may be discarded when no flow queue is available to service the frames or when the network processor 10 simply has to dispose of a certain number of frames due to network congestion or the like.

Typically the discard queue is serviced on a scheduled basis, with sufficient priority that the discard queue is kept close to an empty condition, so as to promptly free up the space occupied by the frames to be discarded in the first data buffer 24.

As is also familiar to those who are skilled in the art, it becomes necessary from time to time to disable a flow, as when the connection represented by the flow is terminated, and then to reconfigure the flow so as to serve a new connection. In accordance with conventional practices, a disable bit is written to the flow control structure (stored in the memory 36) corresponding to the flow to be disabled. This prevents any new frames from being enqueued to the flow. Such new frames are, instead, enqueued to the discard queue. Frames already enqueued to the flow are serviced in ordinary course according to the QoS to which the flow is entitled. A queue byte count, which indicates the amount of data in the flow (buffered in the first data buffer 24) is monitored. As the frames enqueued to the flow are transmitted, the associated buffer space in the first data buffer 24 is released for use, and the queue byte count decreases. When the queue byte count reaches zero, indicating that the flow is empty, the flow may then be reconfigured for use by another connection. As is appreciated by those who are skilled in the art, the reconfiguring of the flow may involve changes in the QoS, the output port, and other flow parameters.

A disadvantage of the conventional procedure for disabling a flow is that reconfiguration of the flow must await transmission of all enqueued frames to empty the flow queue. This delay may adversely affect performance of the network processor. Furthermore, there is overhead involved in repeatedly reading the queue byte count until the flow has emptied and the queue byte count has reached zero. It would be desirable to reduce the amount of time required to reconfigure a flow after the flow is disabled.

SUMMARY OF THE INVENTION

According to a first aspect of the invention, a method is provided in a network processor that services a plurality of flows including a first flow and a discard flow, the first flow including a first flow queue and the discard flow including a discard queue that lists frames to be discarded. The method according to this aspect of the invention includes indicating that the first flow is to be disabled, and, in response to the indicating step, transferring to the discard queue at least one frame included in the first flow queue. The transferring step may include transferring to the discard queue all frames included in the first flow queue. The method may further include reconfiguring the first flow after the transferring step.

According to a second aspect of the invention, a method is provided in a network processor that services a plurality of flows including a first flow. The method according to this aspect of the invention includes indicating that the first flow is to be disabled, and, in response to the indicating step, discarding all frames included in a flow queue that corresponds to the first flow.

The discarding step may include enqueuing to a discard queue all frames included in the flow queue that corresponds to the first flow.

According to further aspects of the invention, network processors adapted to perform the above methods are provided. Numerous other aspects are provided, as are computer program products. Each innovative computer program product may be carried by a medium readable by a computer (e.g., a floppy disk, a hard drive, a random access memory, etc.).

With the present invention, a flow queue corresponding to a flow to be disabled is immediately emptied by transferring to a discard queue all frames enqueued to the flow to be disabled. Consequently, a queue byte counter need not be monitored, and reconfiguration of the flow queue can proceed immediately upon disabling of the flow queue. Accordingly, the performance of a network processor can be improved, and overhead involved in disabling flows can be reduced.

Other objects, features and advantages of the present invention will become more fully apparent from the following detailed description of exemplary embodiments, the appended claims and the accompanying drawings.

DETAILED DESCRIPTION

Figure 1:
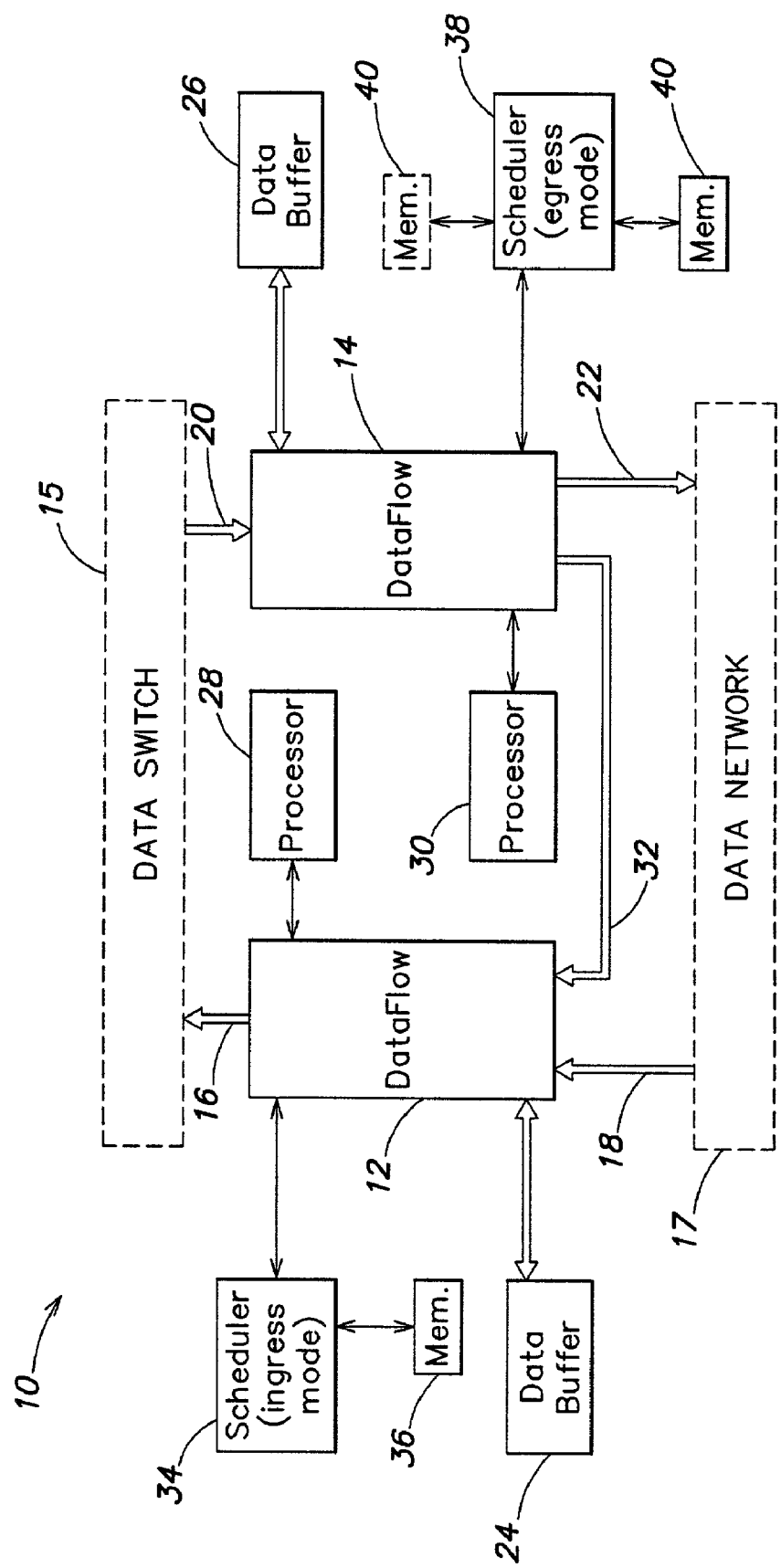
FIG. 1 is a block diagram of a conventional network processor in which the present invention may be applied.
Figure 2:
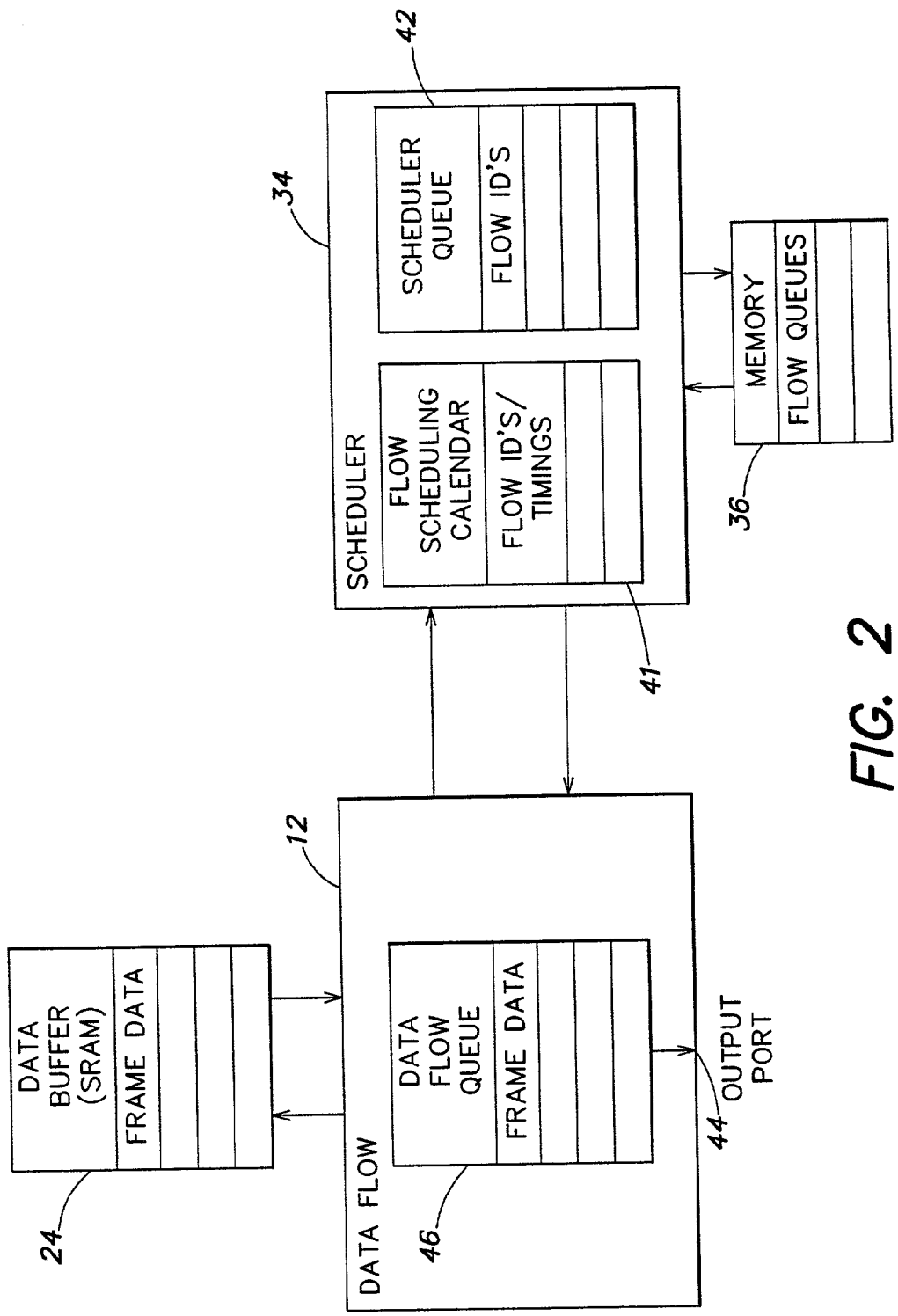
FIG. 2 is a block diagram representation of conventional queuing arrangements provided in a data flow chip/scheduler pair included in the network processor of FIG. 1.
Figure 3:
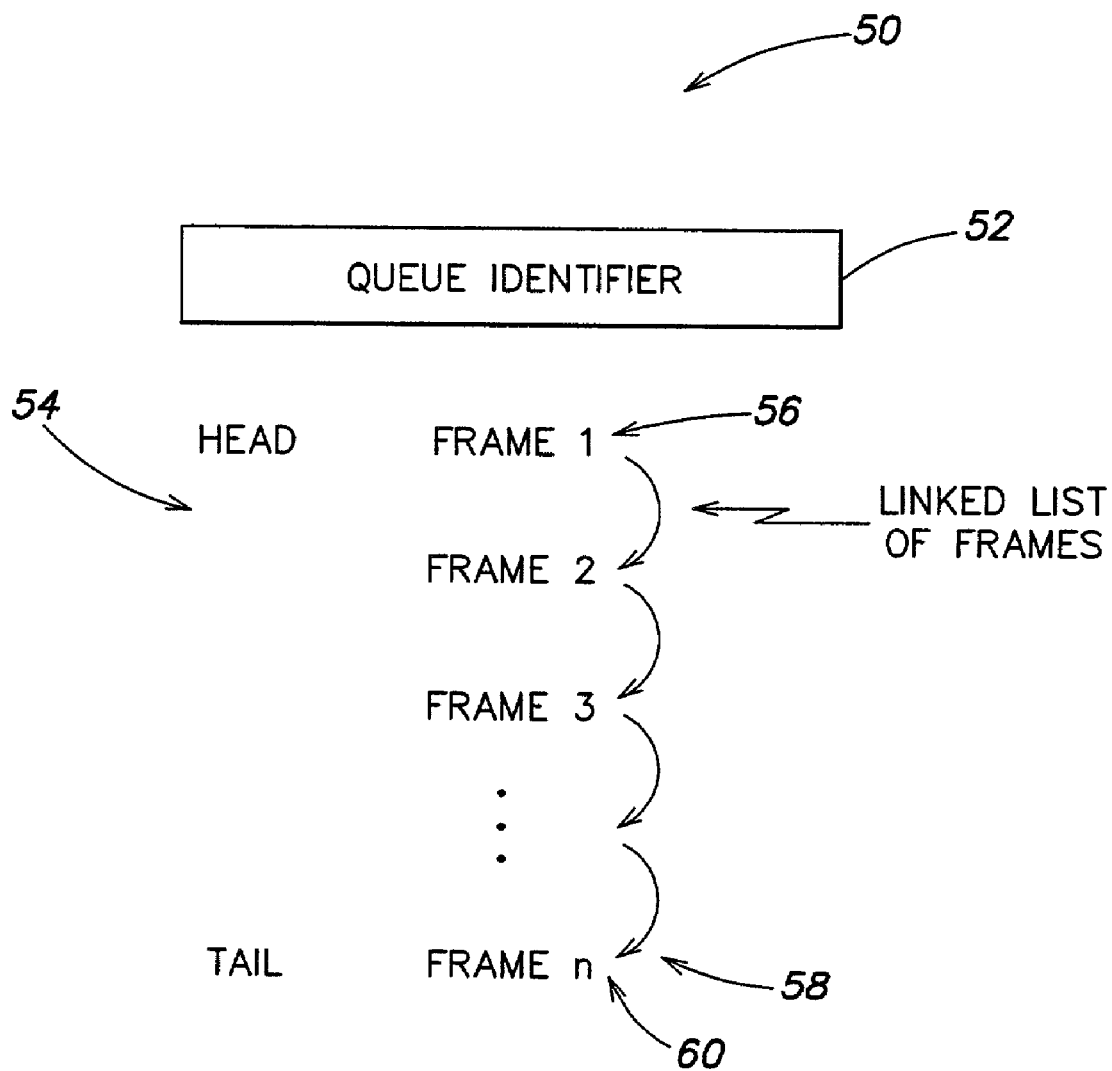
FIG. 3 is a schematic representation of a conventional flow queue stored in a memory associated with a scheduler and shown in FIGS. 1 and 2.
Figure 4:
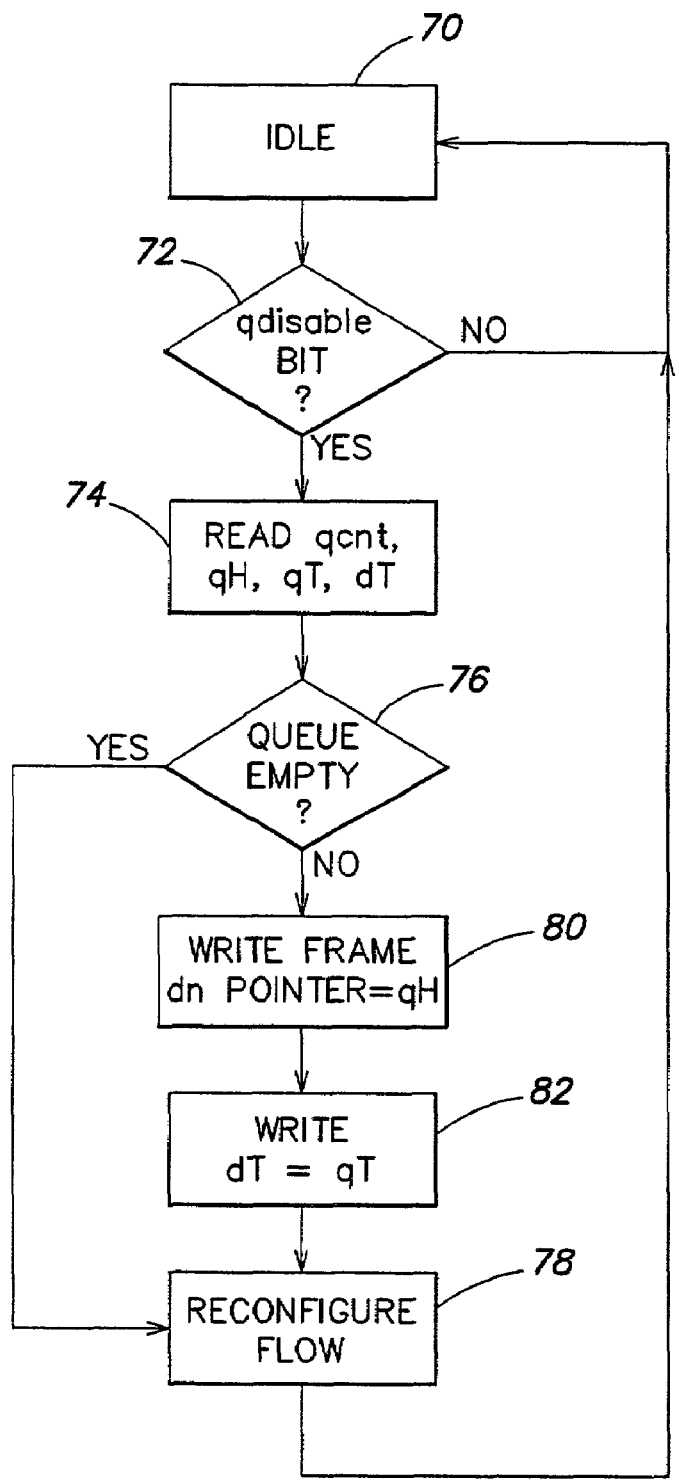
FIG. 4 is a flow chart that illustrates a procedure for disabling and reconfiguring a flow in accordance with the present invention.

An exemplary embodiment of the invention will now be described with reference to FIGS. 4 and 5. FIG. 4 is a flow chart that illustrates a process for disabling and reconfiguring a flow in accordance with the invention. Initially the procedure of FIG. 4 idles at block 70, until a disable bit ("qdisable") is written to indicate that a flow is to be disabled (decision block 72). In one embodiment, writing of the disable bit may be initiated in the first processor chip 28 (FIG. 1) and passed through the first data flow chip 12 to the first scheduler chip 34. Once the disable bit has been written, block 74 follows. At block 74 the queue byte count ("qcnt") for the flow to be disabled is read, along with the head ("qH") for the flow queue corresponding to the flow to be disabled, the tail ("qT") for the same flow queue, and the tail ("dT") for the discard queue. It is then determined, in decision block 76, whether the queue byte count indicates that the queue is empty. If so, reconfiguring of the flow can proceed immediately (block 78). Otherwise, blocks 80 and 82 follow decision block 76.

At block 80 the last frame in the discard queue ("FRAME dn") is caused to refer to the frame at the head of the flow queue corresponding to the flow to be disabled. In this way, the string of frame pointers for the flow queue corresponding to the flow to be disabled are appended to the discard queue. Then, at block 82, the tail of the flow w queue for the flow to be disabled is caused to become the tail of the discard queue. This completes the transfer of all frames from the flow queue corresponding to the flow to be disabled to the discard queue, and reconfiguration of the flow (block 78) may follow immediately. Reconfiguration of the flow (block 78) may include, for example, changes in the QoS, the output port and other flow parameters as is known in the art.

Figure 5:
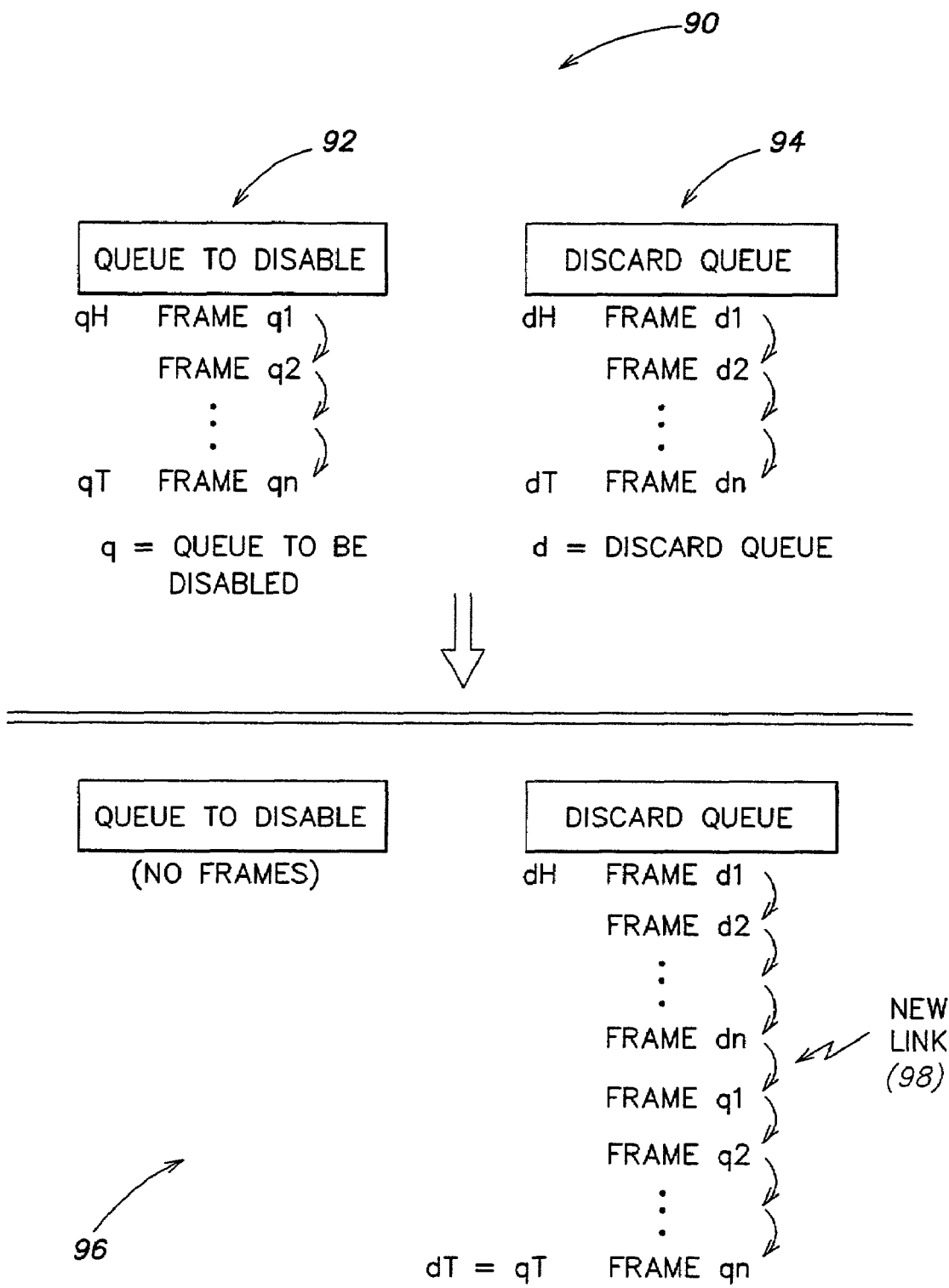
FIG. 5 is a schematic illustration of transferring frame pointers from a queue to be disabled to a discard queue in accordance with the invention.

FIG. 5 schematically illustrates the transfer of frame pointers to the discard queue from the flow queue corresponding to the flow to be disabled. In an upper portion 90 of FIG. 5, the flow queue corresponding to the flow to be disabled is indicated at 92, and the discard queue is indicated at 94. It will be noted that FRAME q1 is at the head of the flow queue 92, and FRAME dn is at the tail of the discard queue. In a lower portion 96 of FIG. 5, the flow queue 92 is shown as being empty, and a new link 98 is shown linking FRAME dn to FRAME q1, thereby appending the string of frames from the flow queue 92 to the discard queue 94. The queue byte count for the flow queue 92 can be zeroed, since the flow queue 92 is empty, and, as noted in connection with FIG. 4, reconfiguration of the flow can proceed immediately.

The software required to carry out the inventive process of FIG. 4 may be developed by a person of ordinary skill in the art and may include one or more computer program products. Such software may be stored, for example, in a memory, such as a RAM or ROM (not separately shown) associated with the first scheduler chip 34 or the second scheduler chip 38, as the case may be.

With the present invention, reconfiguration of a flow to be disabled can proceed immediately upon indicating disabling of the flow, because the flow queue for the flow is immediately emptied by transferring to the discard queue frame pointers enqueued to the flow. Consequently, flows are made available for reuse more quickly than in accordance with prior art practices, and the performance of the network processor thus may be enhanced. Furthermore, there is no need to incur the overhead of monitoring the queue byte count after disablement of the flow.

The foregoing description discloses only exemplary embodiments of the invention; modifications of the above disclosed apparatus and methods which fall within the scope of the invention will be readily apparent to those of ordinary skill in the art. For example, in the above description, the invention has been implemented in a network processor which includes separate scheduler and data flow chips. However, it is also contemplated to implement the invention in connection with a scheduler circuit that is implemented as part of a data flow chip or as part of a processor chip.

Accordingly, while the present invention has been disclosed in connection with exemplary embodiments thereof, it should be understood that other embodiments may fall within the spirit and scope of the invention, as defined by the following claims.

The invention claimed is:

1. In a network processor receiving inbound data flows that services a plurality of flows including a first flow and a discard flow, a method comprising:

indicating in a network processor that the first flow including a first flow queue is to be disabled;

appending to a discard queue, a string of frame pointers for the first flow queue corresponding to the first flow to be disabled; and in response to the indicating step, transferring to the discard flow including a discard queue that list frames to be discarded indicated by the string of frame pointers at least one frame included in the first flow queue, and discarding all frames included in the first flow queue as indicated by the string of frame pointers;

wherein the discarding step includes enqueuing to the discard queue all frames included in the flow queue that correspond to the first flow, wherein the enqueuing step includes linking to a last frame in the discard queue a first one of the frames included in the flow queue that corresponds to the first flow, and wherein the transferring step includes: transferring to the discard queue all frames included in the first flow queue, and linking a first one of the frames to be transferred to a last one of the frames in the discard queue.

2. The method of claim 1, further comprising reconfiguring the first flow upon disabling of the first flow queue.

3. The method of claim 1, wherein the indicating step includes writing a disable bit to the first flow.

4. A network processor receiving inbound data flows, comprising:

means for servicing a plurality of flows in a network processor including a first flow and a discard flow;

means for storing a first flow queue and a discard queue, the first flow queue corresponding to the first flow and the discard queue corresponding to the discard flow; means for indicating that the first flow queue is to be disabled;

means for appending to the discard queue, a string of frame pointers for the first flow queue corresponding to the first flow to be disabled;

means, responsive to the means for indicating, for transferring to the discard queue at least one frame included in the first flow queue as indicated by the string of frame pointers, wherein the means for transferring includes means for transferring to the discard queue all frames included in the first flow queue, and means for linking a first one of the frames to be transferred to a last one of the frames in the discard queue, means, responsive to the means for indicating, for discarding all frames included in the first flow queue as indicated by the string of frame pointers; wherein the means for discarding includes enqueuing to the discard queue all frames included in the flow queue that correspond to the first flow, and wherein the means for enqueuing includes linking to a last frame in the discard queue a first one of the frames included in the flow queue that corresponds to the first flow.

5. The network processor of claim 4, further comprising means for reconfiguring the first flow after disabling the first flow queue.

6. The network processor of claim 4, wherein the means for indicating includes means for writing a disable bit to the first flow. pg,20

* * * * *